(12) United States Patent
Clouet

(10) Patent No.: US 8,768,165 B2
(45) Date of Patent: Jul. 1, 2014

(54) METHOD AND ARRANGEMENT FOR IN SERVICE RAMAN GAIN MEASUREMENT AND MONITORING

(75) Inventor: Benoit Clouet, Munich (DE)

(73) Assignee: Xieon Networks S.a.r.l., Luxemburg (LU)

( * ) Notice: Subject to any disclaimer, the term of this patent is extended or adjusted under 35 U.S.C. 154(b) by 131 days.

(21) Appl. No.: 13/392,654

(22) PCT Filed: Aug. 25, 2009

(86) PCT No.: PCT/EP2009/060914
§ 371 (c)(1),
(2), (4) Date: Mar. 26, 2012

(87) PCT Pub. No.: WO2011/023220
PCT Pub. Date: Mar. 3, 2011

(65) Prior Publication Data
US 2012/0177366 A1 Jul. 12, 2012

(51) Int. Cl.
*H04B 10/08* (2006.01)

(52) U.S. Cl.
USPC .......... 398/30; 398/31; 398/33; 398/38; 398/79

(58) Field of Classification Search
CPC ........... H04B 10/075; H04B 10/077; H04B 10/0775; H04B 10/07955; H04B 10/2916; H04B 10/2537
USPC ............. 398/30, 38, 25, 32, 33, 31, 34, 79; 359/334, 327, 341.41, 341.42
See application file for complete search history.

(56) References Cited

U.S. PATENT DOCUMENTS

| | | | |
|---|---|---|---|
| 6,734,954 B2 * | 5/2004 | Reepschlager et al. | 356/73.1 |
| 7,233,742 B2 * | 6/2007 | Hoshida et al. | 398/79 |
| 7,627,244 B2 * | 12/2009 | Fujita | 398/19 |
| 8,248,689 B2 * | 8/2012 | Kondoh et al. | 359/334 |
| 8,554,088 B2 * | 10/2013 | Goto | 398/201 |
| 2001/0050807 A1 * | 12/2001 | Deguchi et al. | 359/341.44 |
| 2002/0167716 A1 * | 11/2002 | Yamanaka | 359/334 |
| 2004/0120664 A1 | 6/2004 | Dewitt | |
| 2005/0024712 A1 * | 2/2005 | Hiraizumi et al. | 359/334 |
| 2009/0169212 A1 * | 7/2009 | Onaka et al. | 398/79 |
| 2009/0190204 A1 * | 7/2009 | Onaka et al. | 359/334 |
| 2009/0190205 A1 * | 7/2009 | Onaka et al. | 359/334 |
| 2009/0195863 A1 | 8/2009 | Onaka et al. | |
| 2009/0213454 A1 * | 8/2009 | Noheji et al. | 359/334 |
| 2011/0058821 A1 * | 3/2011 | Goto | 398/195 |

FOREIGN PATENT DOCUMENTS

| | | |
|---|---|---|
| EP | 1248334 A2 | 10/2002 |
| EP | 1508985 A1 | 2/2005 |
| EP | 2086132 A1 | 8/2009 |
| JP | 2009186615 A | 8/2009 |

* cited by examiner

*Primary Examiner* — Daniel Washburn
*Assistant Examiner* — Hibret Woldekidan
(74) *Attorney, Agent, or Firm* — Nelson Mullins Riley & Scarborough LLP

(57) ABSTRACT

The invention refers a method and an arrangement for in service Raman gain measurements and monitoring of a wavelength division multiplex system. By measuring the power level values of a transmitted WDM signal (WMS_TX) and an optical supervisory signal (OSS_TX) at the transmitter and the power level values of the received signals (WMS_RX; OSS_RX) the Raman gain can be calculated for the different channels.

12 Claims, 1 Drawing Sheet

METHOD AND ARRANGEMENT FOR IN SERVICE RAMAN GAIN MEASUREMENT AND MONITORING

FIELD OF THE INVENTION

The invention refers a method and an arrangement for in service Raman gain measurements and monitoring of a wavelength division multiplex system.

BACKGROUND OF THE INVENTION

In optical transport networks a plurality of high speed data signals is transmitted as a (dense) wavelength division signal via optical fibers. Optical fiber amplifiers (EDFAs) or semiconductor amplifiers and in addition Raman amplifiers are used for signal amplification. Raman amplification is induced in the transmission fiber by one or more Raman pump signals injected into the transmission fiber usually against the signal propagating direction. The Raman amplification depends on the frequency difference between the Raman pump signal and the signal or channel frequency. The exact Raman gain obtained in the network is usually different from an predicted gain.

Several methods for measuring Raman gain are described so far:

US 2004/0120664 discloses a method and an arrangement for measuring Raman gain based on means of optical time domain reflectometry which is not suited for measurements with live traffic.

EP 1 508 985 proposes a solution based on a low frequency intensity modulation of a Raman pump signal. A corresponding intensity modulation of the optical signal is then measured. The Raman on-off gain is then determined from the intensity modulation in the optical signal.

EP 1 248 334 describes a method and a system for automatic in service gain control based on a spectrum analyser. The method and system permit in service measurements, permits derivation of the Raman gain and dynamic adjustments of system parameters, especially a power profile of received signals.

OBJECTS AND SUMMARY OF THE INVENTION

It is an object of the invention to provide a method and an arrangement for in service Raman gain measurement with reduced complexity.

The measurement can be used for monitoring or controlling purposes.

The object is achieved by the features recited in the method claim 1 and in the arrangement claim 7.

According to the present invention there is provided a method for Raman gain spectrum measurement of an optical WDM (wavelength division multiplex) signal implying a plurality of channels transmitted via an optical fiber, comprising the steps of at a transmitter side generating an optical supervisory signal;
transmitting said supervisory signal together with the WDM signal via the fiber;
determining a transmitter power level value of the WDM signal and a transmitter power level value of the optical supervisory signal;
transmitting said transmitter power level values;
at the receiver side measuring a the power level of the received WDM signal and a power level of the received optical supervisory signal; and
calculating a Raman amplification factor from received power level values and measured power level values, and calculating Raman gain values of the WDM channels considering a Raman gain coefficient.

And according to the present invention there is provided an arrangement for Raman gain spectrum measurement of an optical WDM (wavelength division multiplex) signal implying a plurality of channels transmitted via an optical fiber, comprising at a transmitter side a supervisory transmitter designed for generating an optical supervisory signal;
means for determining a transmitter power level value of the WDM signal and a transmitter power level value of the optical supervisory signal;
an optical coupler for combining said supervisory signal with the WDM signal and inserting both signals into the fiber;
means for transmitting said transmitter power level values of the WDM signal and the optical supervisory signal;
at a receiver side an optical splitter for coupling out an received optical supervisory signal and a measurement signal of an received WDM signal;
a supervisory receiver designed for receiving said supervisory signal;
means designed for measuring the power level of the received optical supervisory signal and the power level ($P_{RXT}$) of the received WDM signal; and
calculating a Raman amplification factor from received power level values and measured power values, and calculating Raman gain values of the WDM channels considering a Raman gain coefficient.

The recent invention relies on simple power measurement and exploits existing control mechanism within a WDM system.

The Raman gain of the channels is calculated from power values of the transmitted and the received signals.

The Invention can be used for measurement, configuration or control purposes.

Further advantageous features are described in the pending claims.

BRIEF DESCRIPTION OF THE DRAWINGS

An example of a presently preferred embodiment is described below with reference to an accompanying drawing, where.

DETAILED DESCRIPTION OF THE INVENTION

Figure 1:
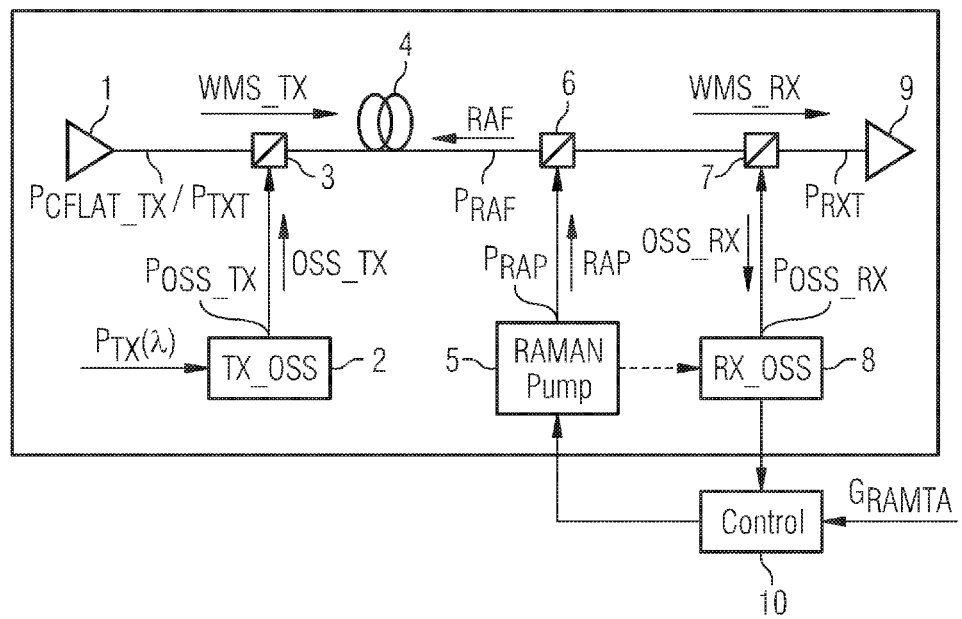
FIG. 1 shows a simplified diagram of a gain measurement and monitoring arrangement and FIG. 2 shows a Raman gain diagram versus frequency difference.

FIG. 1 illustrates an optical fiber link or span. At a transmitter a wavelength division multiplex signal WMS_TX comprising a plurality of optical signals with different wavelengths is amplified by a first optical amplifier 1 and input into a transmission fiber 4. Said optical signals are usually also referred to as channels, which are indicated by different wavelengths λ. In addition an optical supervisory signal OSS_TX is generated by an OSS transmitter (TX_OSS) 2 and combined with the WDM signal WMS via an optical coupler 3 (dichroic or fused coupler or even the same wavelength division multiplexer combining the single channels and outputting the WDM signal) and transmitted via the fiber link in a separate OSS channel with a wavelength different from the wavelengths of the WDM channels.

Transmitter power level values $P_{TX}$ (OCFLAT_TX) and $P_{OSS\_TX}$ the transmitted signals WMS_TX and OSS_TX are measured (not shown) and transmitted via a telemetry channel, e.g. via the OSS channel itself to a receiver.

At the receiving end a Raman pump generator 5 generates a Raman pump signal RAP with power $P_{RAP}$ and a higher frequency than the frequencies of the WDM channels. The Raman pump signal RAP is input via a second coupler 6 into the transmission fiber 4 against the transmission direction of the WDM signal as Raman pump signal RAF with an attenuated power $P_{AF}$. The transmitted WDM signal WMS_TX and the optical supervisory signal OSS_TX sustain impairments like attenuation from the transmission fiber and are amplified by the Raman pump signal.

At the receiving end of the transmission fiber a received WDM signal WMS_RX and a received optical supervisory signal OSS_RX are split by a measurement splitter 7. The received WDM signal WMS_RX is fed to an optical receiver 9, which in most cases comprises a fiber or semiconductor amplifier, and branched of parts of received signals WMS-RX and OSS_RX are fed to a supervisory receiver (RX_OSS) 8. Here the received signals WMS_RX and OSS_RX are separated and their powers are measured (instead of the splitter 7 a wavelength division demultiplexer may be used already separating WMS_RX and OSS_RX; measurement means may be integrated in the RX-OSS or arranged externally).

Because the Raman gain depends on the wavelength difference between an optical signal (channel; OSS_TX) and the pump signal the all channels and the supervisory signal are amplified differently. Because the power level values of the WDM signal and the supervisory signal at the transmitter side and the receiver side are measured and the fiber length is also known, the Raman gain spectrum—the Raman gain for the single channels (channel is here used instead of signals) of the WDM signal—can be derived considering a Raman gain coefficient. For Raman gain control the power $P_{RAP}$ of the pump signal RAP can be also measured.

The following equations are derived for a single pump source and a single optical signal/channel. They are also valid for multiple Raman pumps when interaction—the exchange of energy between the Raman pump signals—can be neglected. Multiple Raman pumps can be considered by superposition.

The power budget for single signal/channel in the span is given by $$P_{RX}(\lambda) = P_{TX}(\lambda) - \alpha(\lambda)*L - IL_{DISCRET} + G_{RAMAN}(\lambda) \quad (1)$$

wherein $P_{TX}(\lambda)$—transmitter power level value at the output of the transmitter/beginning of the span;

$P_{RX}(\lambda)$—power level value of WMS_RX at the input of the receiver at the end of the span;

$\alpha(\lambda)$—fiber attenuation; L—fiber (span) length;

$IL_{DISCRET}$—discrete insertion loss of filter/splitter/couplers and connector/splice loss in the fiber span;

$G_{RAMAN}(\lambda)$—Raman amplification for a channel with wavelength $\lambda$; all values are logarithmic values, e.g. in decibel.

For the supervisory channel the equation (1) is rewritten in logarithmic form $$P_{OSS\_RX} = P_{OSS\_TX}(\lambda_{OSS}) - \alpha(\lambda_{OSS})*L - IL_{DISCRETE} + G_{RAMAN}(\lambda_{OSS}) \quad (2)$$

wherein $P_{OSS\_RX} = P_{OSS\_RX}(\lambda_{OSS})$—receiver power level value of the supervisory signal with $\lambda_{OSS}$ at the input of the OSS receiver;

$P_{OSS\_TX}(\lambda_{OSS})$—transmitter power level value of OSS at the output of the OSS transmitter; $IL_{DISCRETE}$—insertion loss of discrete elements; $G_{RAMAN}(\lambda_{OSS})$—Raman gain of the OSS.

Equations (1) and (2) are rewritten in exponential form $$P_{RX}(\lambda) = P_{TX}(\lambda) * 10 \exp\left(\frac{-\alpha(\lambda)L - IL_{DISCRETE} + G_{RAMAN}(\lambda)}{10}\right) \quad (3)$$

and $$P_{OSS\_RX} = P_{OSS\_TX} * 10 \exp\left(\frac{-\alpha(\lambda_{OSS})L - IL_{DISCRETE} + G_{RAMAN}(\lambda_{OSS})}{10}\right) \quad (4)$$

with $P_{OSS\_RX} = P_{OSS\_RX}(\lambda_{OSS})$; $P_{OSS\_TX} = P_{OSS\_TX}(\lambda_{OSS})$.

For a plurality of channels we get for the total power $P_{RXT}$ at the receiver a sum):

$$P_{RXT} = \sum_{m=1}^{Nch} P_{TX}(\lambda_m) * 10 \exp\left(\frac{-\alpha(\lambda_m)L - IL_{DISCRETE} + G_{RAMAN}(\lambda_m)}{10}\right) \quad (5)$$

with m=1–Nch, number of channels;

Assuming a flat spectrum for the channels at the output of the first amplifier (booster) 1:

$$P_{TXT} = \sum_{m=1}^{Nch} P_{CFLAT\_TX} = P_{CFLAT\_TX} * Nch \quad (6)$$

wherein $P_{CFLAT\_TX}$ is a transmitter (calculated) power level of a single channel at TX assuming the spectrum is flat.

The equation (5) can be rewritten:

$$P_{RXT} = P_{CFLAT\_TX} \sum_{m=1}^{Nch} 10 \exp\left(\frac{-\alpha(\lambda_m)L - IL_{DISCRETE} + G_{RAMAN}(\lambda_m)}{10}\right) \quad (7)$$

Writing equation (7) over equation (4) and multiplying with $P_{OSS\_TX}/P_{CFLAT\_TX}$ we get:

$$\frac{P_{RXT} * P_{OSS\_TX}}{P_{OSS\_RX} * P_{CFLAT\_TX}} = \sum_{m=1}^{Nch} 10 \exp\left(\frac{[\alpha(\lambda_{OSS}) - \alpha(\lambda_m)]L + G_{RAMAN}(\lambda_m) - G_{RAMAN}(\lambda_{OSS})}{10}\right) \quad (8)$$

wherein $[\alpha(\lambda_{OSS}) - \alpha(\lambda)]L$ is the linear attenuation difference of the fiber at the OSS wavelength and a wavelength e.g. in the C-band. This can be extrapolated from the increase of fiber attenuation with lower wavelengths due to Rayleigh scattering. Equal $IL_{DISCRETE}$ for WMS and OSS is assumed.

The Raman gain $G_{RAMAN}(\lambda)$ is a function of the Raman gain coefficient $g_R(\lambda)$ and a factor $\kappa$. $\kappa$ is a function of the Raman pump power and can be derived according to $$G_{RAMAN}(\lambda) = \kappa * g_R(\lambda) \quad (9)$$

where $g_R(\lambda) = g_R(\lambda - \lambda_{RAP})$ is the Raman gain coefficient as a function of the wavelength difference between $\lambda$ and the wavelength $\lambda_{RAP}$ of the Raman pump, assumed to be known.

Figure 2:
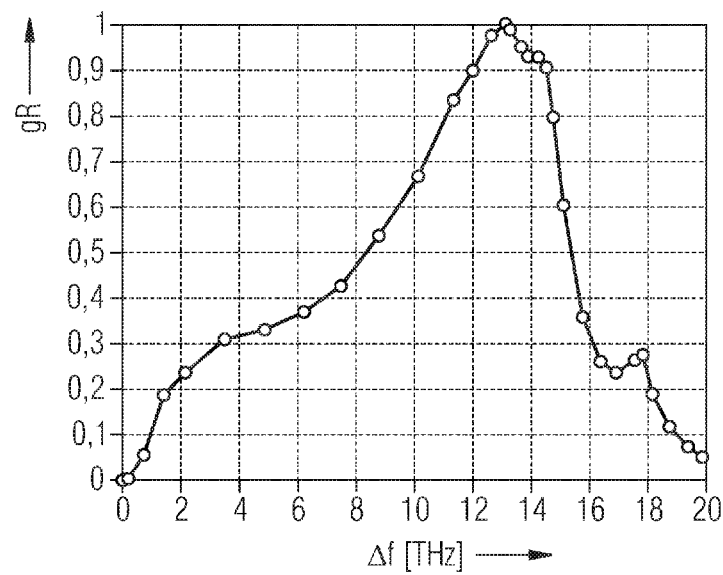

FIG. 2 illustrates an example of the Raman gain coefficient $g_R$ for a pure silica fiber as a function of a frequency difference $\Delta f$ between the Raman pump signal and another optical signal. And $\kappa$ is a Raman amplification factor, assumed to be unknown, as a function of the Raman pump power.

The equation (8) can be rewritten with equation (9)

$$\frac{P_{RXT} * P_{OSS\_TX}}{P_{OSS\_RX} * P_{CFLAT\_TX}} = \sum_{m=1}^{Nch} 10\exp\left(\frac{[\alpha(\lambda_{OSS}) - \alpha(\lambda_m)]L + [g_R(\lambda_m) - g_R(\lambda_{OSS})]\kappa}{10}\right) \quad (10)$$

or $$\frac{P_{RXT} * P_{OSS\_TX}}{P_{TXT} * P_{OSS\_RX}} = \frac{1}{Nch}\sum_{m=1}^{Nch} 10\exp\left(\frac{[\alpha(\lambda_{OSS}) - \alpha(\lambda_m)]L + [g_R(\lambda_m) - g_R(\lambda_{OSS})]\kappa}{10}\right) \quad (10b)$$

substituting the transmitter power level $P_{CFLAT\_TX}$ by the WMS_TX transmitter power level $P_{TXT}$.

It is possible to extend equation (10) for a multiple Raman pump by measuring the Raman pump power for each Raman wavelength, to retrieve the total Raman gain experienced by the signal. The equation (9) is then extended in the following way. Instead of having:

$$[g_R(\lambda - \lambda_{RAP}) - g_R(\lambda_{OSS} - \lambda_{RAP})] * \kappa_0 * P_{RAP}$$

we now must consider several pump wavelengths:

$$\Sigma[g_R(\lambda - \lambda_{RAP}(i)) - g_R(\lambda_{OSS} - \lambda_{RAP}(i))] * \kappa_0 * P_{RAP}(i) \quad (11)$$

wherein i index variable of the pump sources and according to $$\kappa = \kappa_o * P_{RAP} \quad (12)$$

$\kappa$ is substituted by $\kappa_o * P_{RAP}(i)$.

The only unknown value in equation (10) is the Raman amplification factor $\kappa$, or substituting $\kappa$ by $\kappa_o * P_{RAP}$, the only unknown value in equation 10 or in an extended equation is a Raman amplification coefficient $\kappa_0$. And we can proceed as explained above to derive $\kappa_0$ from equation (10).

$$G_{RAMAN}(\lambda) = 4.34[L_{EFF}(\lambda_{pump})/(2A_{EFF})] * P_{RAF} * g_R(\lambda) \quad (13)$$
$$= \kappa * g_R(\lambda)$$

and with $P_{RAF} = IL_{RAP} * P_{RAP}$ $$\kappa = 4.34[L_{EFF}/(2A_{EFF})] * IL_{RAP} * P_{RAP} = \kappa_0 * P_{RAP} \quad (14)$$

wherein
$A_{EFF}$—effective area of the fiber;
$L_{EFF}$—effective fiber length for the Raman pump wavelength; $P_{RAF}$-Raman pump power sent into the fiber and thus is equal to $IL_{RAP} * P_{RAP}$, where $IL_{RAP}$ represent the discrete insertion loss (connector/filter/splitter loss) between the Raman pump output (where the Raman pump power $P_{RAP}$ is measured) and the fiber.

From (10) we can derive $\kappa$ or $\kappa_0$ and therefore calculate $G_{RAMAN}(\lambda)$ for each channel according equation (9) or an extended equation $$G_{RAMAN}(\lambda) = \kappa_0 * P_{RAP} * g_R(\lambda) \quad (15)$$

which is advantageously used for Raman gain control.

The invention is e.g. applied when a transmission system is configured. First the transmitter power values $P_{TXT}$($P_{CFLAT\_TX}$), $P_{OSS}$_TX and the receiver power values $P_{RXT}$, $P_{OSS\_RX}$ are measured and the Raman gain coefficient is retrieved. Then e.g. formula 10b is used to calculate back the Raman amplification factor K. This is simply done by calculating the right term of equation 10b for several values of K and then interpolate to the value that gives the closest match to the left hand-side value.

Then the Raman gain is deduced through equation (13).

The invention may not be only used for determining the Raman gain but also for controlling the fiber link. Therefore FIG. 1 comprises also a control unit 10 receiving all necessary measured values and calculating the Raman gain for all channels. The calculated values are then compared with target (reference) values $G_{RAMTA}$ and the power of the (multiple) Raman pump is controlled (the power level of the Raman pump is forwarded (dashed line) via the $RX_{\_OSS}$ to the control unit) accordingly to an adequate target value $P_{RAMTA}$ or to "i" target values $G_{RAMTA}(i)$ for a multiple Raman pump, e.g. to maintain the predetermined Raman gain spectrum. The invention may be combined with further control circuits. Possible aims are e.g. equal power or equal signal to noise ratios of all channels.

The present invention is not limited to the details of the above described principle. The scope of the invention is defined by the appended claims and all changes and modifications as fall within the equivalents of the scope of the claims are therefore to be embraced by the invention. This applies also to variably points of the system suited for measuring the power values of the transmitted and received signals e.g. before and behind a splitter. The invention may be also adapted for Raman pumps pumping—also in addition—in the transmission direction of the WDM signal.

REFERENCE SIGNS AND ABBRIVATIONS 1 transmitter
2 OSS transmitter (TX_OSS)
3 (dichroic) coupler
4 transmission fiber
5 Raman pump
6 second coupler
7 splitter
8 supervisory receiver ($RX_{\_OSS}$)
9 receiver
10 control unit
OSS supervisory signal
OSS_TX transmitted supervisory signal
$P_{OSS\_TX}$ power of transmitted OSS_TX
WMS_TX WDM signal
$P_{TX}(\lambda)$ power of WDM channel $\lambda$ at TX
$P_{CFLAT\_TX}$ channel power for single channel of a flat WDM signal
RAP Raman pump signal
RAF Raman pump signal inserted into the fiber
$P_{RAP}$ power of generated Raman pump signal
$P_{RAF}$ power of the Raman pump signal inserted into the fiber
$P_{RxT}$ total power of the received WDM signal
OSS_RX received supervisory signal
$P_{OSS\_RX}$ power of received OSS_RX $G_{RAMTA}(\lambda)$ Raman gain target value
$P_{RAPTA}$ Raman pump power target value
$g_R(\lambda)$ Raman gain coefficient
$\kappa_o$ Raman amplification coefficient
$\kappa$ Raman amplification factor
$\Delta f$ frequency difference

The invention claimed is:

1. A method for Raman gain spectrum measurement of an optical WDM (wavelength division multiplex) signal implying a plurality of channels transmitted via an optical fiber, the method which comprises:
at a transmitter side, generating an optical supervisory signal (OSS_TX);
transmitting the supervisory signal (OSS_TX) together with the WDM signal via the optical fiber;
determining a transmitter power level value ($P_{CFLAT\_TX}$/$P_{TXT}$) of a transmitted WDM signal (WMS_TX) and a transmitter power level value ($P_{OSS\_TX}$) of the transmitted optical supervisory signal (OSS_TX);
transmitting the transmitter power level values ($P_{CFLAT\_TX}$/$P_{TXT}$; $P_{OSS\_TX}$);
at a receiver side, measuring a receiver power level value ($P_{RXT}$) of a received WDM signal (WMS_RX) and a receiver power level value ($P_{OSS\_RX}$) of a received supervisory signal (OSS_RX); characterized by the steps of:
calculating a Raman amplification factor ($\kappa$) from transmitter power level values ($P_{OSS\_TX}$, $P_{TXT}$) and receiver power level values ($P_{OSS\_RX}$, $P_{RXT}$) based on wavelength dependent Raman gain coefficients $g_R(\lambda-\lambda_{RAP})$ for each of said channels of said WDM signal and a wavelength dependent Raman gain coefficient $g_R(\lambda_{OSS}-\lambda_{RAP})$ of said supervisory signal, and
calculating Raman gain values ($G_{RAMAN}(\lambda)$) of the WDM channels ($\lambda$) based on said Raman amplification factor ($\kappa$) and said wavelength dependent Raman gain coefficient $g_R(\lambda-\lambda_{RAP})$ of said channels, said wavelength dependent Raman gain coefficient $g_R(\lambda-\lambda_{RAP})$ being a function of the difference between a channel wavelength $\lambda$ and a Raman pump wavelength $\lambda_{RAP}$.

2. The method according to claim 1, which comprises:
calculating a Raman amplification factor ($\kappa$) from either:

$$\frac{P_{RXT} * P_{OSS\_TX}}{P_{OSS\_RX} * P_{CFLAT\_TX}} = \sum_{m=1}^{Nch} 10\exp\left(\frac{[\alpha(\lambda_{OSS}) - \alpha(\lambda_m)]L + [g_R(\lambda_m - \lambda_{RAP}) - g_R(\lambda_{OSS} - \lambda_{RAP})]\kappa}{10}\right)$$

or $$\frac{P_{RXT} * P_{OSS\_TX}}{P_{TXT} * P_{OSS\_RX}} = \frac{1}{Nch} \sum_{m=1}^{Nch} 10\exp\left(\frac{[\alpha(\lambda_{OSS}) - \alpha(\lambda_m)]L + [g_R(\lambda_m - \lambda_{RAP}) - g_R(\lambda_{OSS} - \lambda_{RAP})]\kappa}{10}\right),$$

in case of a single pump wavelength $\lambda_{RAP}$, or $$\frac{P_{RXT} * P_{OSS\_TX}}{P_{OSS\_RX} * P_{CFLAT\_TX}} =$$

$$\sum_{m=1}^{Nch} 10\exp\left(\frac{[\alpha(\lambda_{OSS}) - \alpha(\lambda_m)]L + \sum_{i=1}^{N_{PUMP}}[g_R(\lambda_m - \lambda_{RAP}(i)) - g_R(\lambda_{OSS} - \lambda_{RAP}(i))]\kappa_0 * P_{RAP}(i)}{10}\right)$$

or $$\frac{P_{RXT} * P_{OSS\_TX}}{P_{TXT} * P_{OSS\_RX}} =$$

$$\frac{1}{Nch}\sum_{m=1}^{Nch} 10\exp\left(\frac{[\alpha(\lambda_{OSS}) - \alpha(\lambda_m)]L + \sum_{i=1}^{N_{PUMP}}[g_R(\lambda_m - \lambda_{RAP}(i)) - g_R(\lambda_{OSS} - \lambda_{RAP}(i))]\kappa_0 * P_{RAP}(i)}{10}\right)$$

in case of plural pump wavelengths $\lambda_{RAP}(i)$
and from the Raman gain values according to $$G_{RAMAN}(\lambda) = \kappa * g_R(\lambda - \lambda_{RAP}),$$

wherein
$P_{OSS\_TX}(\lambda_{OSC})$ is a transmitter power level value of OSS_TX at the output of the OSS transmitter;
$P_{TXT}$ is a transmitter power level value of the WDM signal WMS_TX;
$\alpha(\lambda_{OSS})$ is the attenuation of the fiber at the wavelength $\lambda_{OSS}$ of the supervising signal;
$\alpha(\lambda_m)$ is the attenuation of the fiber at the wavelength $\lambda_m$ of a channel "m";
L is the length of the fiber;
$P_{CFLAT\_TX}$ is a transmitter power level value of a single channel at the transmitter for a flat WMS_TX spectrum;
Nch is the number of channels ($\lambda_m$);
$P_{RXT}$ is a receiver power level value of WMS_RX at receiver;
$P_{OSS\_RX}$ is a receiver power level value of OSS_RX at the receiver input;
$G_{RAMAN}(\lambda_{OSS})$ is a Raman gain of the OSS;
$g_R(\lambda - \lambda_{RAP})$ is a known Raman gain coefficient;
$\kappa$ is the Raman amplification factor;
$\kappa_0$ is a Raman amplification coefficient;
$P_{RAP}(i)$ is the power of the i-th pump source;
$N_{PUMP}$ is the number of pump sources; and
$\lambda_{RAP}$ is the wavelength of the Raman pump.

3. The method according to claim 2, which further comprises the steps of
measuring a Raman pump signal power ($P_{RAP}$) and substituting the Raman amplification factor ($\kappa$) by a Raman amplification coefficient ($\kappa_o$) and the Raman pump signal power ($P_{RAP}$) according to $$\kappa = \kappa_o * P_{RAP},$$

where:
$\kappa$ is the Raman amplification factor;
$\kappa_o$ is the Raman amplification coefficient;
$P_{RAP}$ is the Raman pump signal power.

4. The method according to claim 3, which further comprises comparing the calculated Raman gain values ($G_{RAMAN}(\lambda)$) with associated target values ($G_{RAMTA}(\lambda)$) and controlling a Raman pump accordingly.

5. The method according to claim 3, which further comprises the steps of:
   comparing the calculated Raman gain values ($G_{RAMAN}(\lambda)$) with associated target values ($G_{RAMTA}(\lambda)$) and controlling the power ($P_{RAP}$) of a Raman pump signal (RAP) according to $$G_{RAMTA}(\lambda)=\kappa g_R(\lambda-\lambda_{RAP})=\kappa_o * P_{RAPTA} * g_R(\lambda-\lambda_{RAP}),$$

wherein
   $G_{RAMTA}(\lambda)$ is a Raman gain target value;
   $P_{RAPTA}$ is a Raman pump power target value for $G_{RAMTA}(\lambda)$;
   $\kappa_o$ is the Raman amplification coefficient.

6. The method according to claim 1, which comprises transmitting the transmitter power levels ($P_{CFLAT\_Tx}/P_{TXT}$; $P_{OSS\_TX}$) of the WDM signal (WMS_TX) and the supervisory signal (OSS_TX) by the supervisory signal (OSS_TX) itself.

7. A configuration for Raman gain spectrum measurement of an optical WDM (wavelength division multiplex) signal (WMS) implying a plurality of channels ($\lambda$) transmitted via an optical fiber, the configuration comprising:
   a supervisory transmitter disposed at a transmitter side and configured for generating an optical supervisory signal (OSS_TX);
   means for determining a transmitter power level value ($P_{CFLAT\_Tx}/P_{TXT}$) of a transmitted WDM signal (WMS_TX) and a transmitter power level value ($P_{OSS\_TX}$) of the transmitted optical supervisory signal (OSS_TX);
   an optical coupler for receiving the supervisory signal (OSS_TX) and injecting the supervisory signal (OSS_TX) into the fiber together with the WDM signal (WMS_TX) and transmitting the signals via the fiber;
   means for transmitting the transmitter power level values ($P_{CFLAT\_Tx}/P_{TXT}$; $P_{OSS\_TX}$) of the WDM signal (WMS_TX) and the optical supervisory signal (OSS_TX);
   an optical splitter disposed at a receiver side for coupling out a measurement signal of a received WDM signal (WMS_RX) and a received optical supervisory signal (OSS_RX);
   a supervisory receiver configured for receiving said supervisory signal;
   means for measuring the receiver power level value ($P_{OSS\_RX}$) of the received optical supervisory signal (OSS_RX) and the receiver power level value ($P_{RXT}$) of the received WDM signal (WMS_RX), characterized by the steps of
   calculating a Raman amplification factor ($\kappa$) from the transmitter power level values ($P_{OSS\_TX}$, $P_{TXT}/P_{CFLAT\_Tx}$) based on wavelength dependent Raman gain coefficients $g_R(\lambda-\lambda_{RAP})$ for each of said channels of said WDM signal and a wavelength dependent Raman gain coefficient $g_R(\lambda_{OSS}-\lambda_{RAP})$ of said supervisory signal and the receiver power level values ($P_{OSS\_RX}$, $P_{RXT}$), and for calculating Raman gain values ($G_{RAMAN}(\lambda)$) of the WDM channels ($\lambda$) based on said wavelength independent Raman amplification factor ($\kappa$) and said wavelength dependent Raman gain coefficients $g_R(\lambda-\lambda_{RAP})$ of said channels, said wavelength dependent Raman gain coefficient $g_R(\lambda-\lambda_{RAP})$ being a function of the difference between a channel wavelength $\lambda$ and a Raman pump wavelength $\lambda_{RAP}$.

8. The arrangement according to claim 7, which is further configured for:
   calculating a Raman amplification factor ($\kappa$) from either $$\frac{P_{RXT} * P_{OSS\_TX}}{P_{OSS\_RX} * P_{CFLAT\_TX}} = \sum_{m=1}^{Nch} 10\exp\left(\frac{[\alpha(\lambda_{OSS})-\alpha(\lambda_m)]L + [g_R(\lambda_m-\lambda_{RAP})-g_R(\lambda_{OSS}-\lambda_{RAP})]\kappa}{10}\right)$$

or $$\frac{P_{RXT} * P_{OSS\_TX}}{P_{TXT} * P_{OSS\_RX}} = \frac{1}{Nch}\sum_{m=1}^{Nch} 10\exp\left(\frac{[\alpha(\lambda_{OSS})-\alpha(\lambda_m)]L + [g_R(\lambda_m-\lambda_{RAP})-g_R(\lambda_{OSS}-\lambda_{RAP})]\kappa}{10}\right)$$

in case of a single pump wavelength $\lambda_{RAP}$, or $$\frac{P_{RXT} * P_{OSS\_TX}}{P_{OSS\_RX} * P_{CFLAT\_TX}} =$$

$$\sum_{m=1}^{Nch} 10\exp\left(\frac{[\alpha(\lambda_{OSS})-\alpha(\lambda_m)]L + \sum_{i=1}^{N_{PUMP}}[g_R(\lambda_m-\lambda_{RAP}(i))-g_R(\lambda_{OSS}-\lambda_{RAP}(i))]\kappa_0 * P_{RAP}(i)}{10}\right)$$

or $$\frac{P_{RXT} * P_{OSS\_TX}}{P_{TXT} * P_{OSS\_RX}} =$$

$$\frac{1}{Nch}\sum_{m=1}^{Nch} 10\exp\left(\frac{[\alpha(\lambda_{OSS})-\alpha(\lambda_m)]L + \sum_{i=1}^{N_{PUMP}}[g_R(\lambda_m-\lambda_{RAP}(i))-g_R(\lambda_{OSS}-\lambda_{RAP}(i))]\kappa_0 * P_{RAP}(i)}{10}\right)$$

in case of plural pump wavelengths $\lambda_{RAP}(i)$ and from the Raman gain values according to $$G_{RAMAN}(\lambda)=\kappa * g_R(\lambda-\lambda_{RAP}),$$

wherein
$P_{OSS\_TX}$—is a transmitter power level value of the supervisory signal OSS_TX at the output of the OSS transmitter;
$P_{TXT}$ is a transmitter power level value of the WDM signal WMS_TX;
$\alpha(\lambda_{OSS})$ is the attenuation of the fiber at the wavelength $\lambda_{OSS}$ of the supervising signal;
$\alpha(\lambda_m)$ is the attenuation of the fiber at the wavelength $\lambda_m$ of a channel "m";
L is the length of the fiber;
$P_{CFLAT\_TX}$ is a transmitter power level value of a single channel of WMS_TX at said transmitter for a flat spectrum;
$P_{OSS\_RX}$ is a receiver power level value of OSS_RX at the OSS receiver input;
$G_{RAMAN}(\lambda_{OSS})$ is a Raman gain of the OSS;
Nch is the number of channels ($\lambda_m$);
$P_{RXT}$ is a receiver power level value of WMS_RX at said receiver;
$g_R(\lambda-\lambda_{RAP})$ is a known Raman gain coefficient;
$\kappa$ is a Raman amplification factor;
$\kappa_0$ is a Raman amplification coefficient;
$P_{RAP}(i)$ is the power of the i-th pump source;
$N_{PUMP}$ is the number of pump sources; and
$\lambda_{RAP}$ is the wavelength of the Raman pump.

9. The configuration according to claim 8, which is further configured for:

measuring and substituting the Raman amplification factor ($\kappa$) by a Raman amplification coefficient ($\kappa_o$) and the Raman pump signal power ($P_{RAP}$) according to $$\kappa = \kappa_o * P_{RAP},$$

where:
$\kappa$ is the Raman amplification factor;
$\kappa_o$ is the Raman amplification coefficient; and
$P_{RAP}$—Raman pump power.

10. The configuration according to claim 9, which is further configured for comparing calculated Raman gain values ($G_{RAMAN}(\lambda)$) with target values ($G_{RAMTA}(\lambda)$) and controlling a Raman pump accordingly.

11. The configuration according to claim 9, which if further configured for:
comparing the calculated Raman gain values ($G_{RAMAN}(\lambda)$) with the target values ($G_{RAMTA}(\lambda)$) and controlling the power ($P_{RAP}$) of a Raman pump signal (RAP) according to $G_{RAMTA}(\lambda) = \kappa g_R(\lambda) = \kappa_o * P_{RAMTA} * g_R(\lambda)$, wherein
$G_{RAMTA}(\lambda)$ is a Raman gain target value;
$P_{RAMTA}$ is a Raman pump power target value for $G_{RAMTA}(\lambda)$; and
$\kappa_o$ is the Raman amplification coefficient derived from $\kappa$.

12. The configuration according to claim 7, wherein said OSS transmitter is configured for modulating the transmitter power level values ($P_{CFLAT\_TX}/P_{TXT}$; $P_{OSS\_TX}$) of the WDM signal (WMS_TX) and the optical supervisory signal (OSS_TX) onto the supervisory signal (OSS_TX).

* * * * *